United States Patent [19]

Aldag et al.

[11] 4,176,324
[45] Nov. 27, 1979

[54] HIGH PERFORMANCE DYE LASER AND FLOW CHANNEL THEREFOR

[75] Inventors: Henry R. Aldag, Boston; Richard G. Morton, N. Reading; Jaime A. Woodroffe, Andover, all of Mass.

[73] Assignee: Jersey Nuclear-Avco Isotopes, Inc., Bellevue, Wash.

[21] Appl. No.: 724,862

[22] Filed: Sep. 20, 1976

[51] Int. Cl.² ............................................. H01S 3/02
[52] U.S. Cl. ........................... 331/94.5 T; 331/94.5 L
[58] Field of Search .................... 331/94.5 L; 330/4.3; 340/8 MM, 8 LF

[56] References Cited

U.S. PATENT DOCUMENTS

| | | | |
|---|---|---|---|
| 3,477,037 | 11/1969 | Seitz | 331/94.5 L |
| 3,487,332 | 12/1969 | Cordy, Jr. | 331/94.5 P |
| 3,677,959 | 7/1972 | Brecher et al. | 331/94.5 L |
| 3,678,410 | 7/1972 | Kocher et al. | 331/94.5 L |
| 3,740,665 | 6/1973 | Itzkan | 331/94.5 L |
| 3,898,584 | 8/1975 | Born | 330/4.3 |

OTHER PUBLICATIONS

Boiteux et al., *Applied Optics*, vol. 9, No. 2, Feb. 1970, pp. 514, 515.

*Primary Examiner*—William L. Sikes
*Attorney, Agent, or Firm*—Weingarten, Maxham & Schurgin

[57] ABSTRACT

A flow channel for a dye laser having means for reducing thermal and pressure variations in the flowing laser medium particularly in the vicinity of active lasing in order to permit high power and high pulse rate lasing with a high quality, low divergence output beam. Pressure disturbances and turbulence are minimized with a number of flow design techniques including a configured input conduit for even pressure drop, a set of turbulence reducing screens, as well as a hydraulic pressure damping capacitor on both input and output ends of the flow channel, either side of the excitation window. A porous wall is used to exhaust the medium and isolate the lasing region from downstream effects. In addition, cooling of the conduit just upstream of the region of active lasing reduces temperature disturbances resulting from applied excitation to further minimize its disturbing effect on laser beam quality and lasing efficiency.

12 Claims, 3 Drawing Figures

HIGH PERFORMANCE DYE LASER AND FLOW CHANNEL THEREFOR

FIELD OF THE INVENTION

The present invention relates to laser flow channels and in particular to a flow channel designed for high efficiency lasing.

BACKGROUND OF THE INVENTION

The dye laser is currently used as a source of laser excitation or amplification in applications of laser enrichment such as is shown, for example, in U.S. Pat. No. 3,944,947.

In such applications there are at least three principal objectives for the laser oscillator or amplifier, namely high energy in each laser pulse, high repetition rate, and an output beam of laser radiation of high optical quality, and low divergence. In these applications, output powers of several hundreds of watts at pulse rates of several hundreds of pulses per second in combination with an output beam as close to diffraction limited as possible are desired goals.

One of the important advances in laser systems in achieving these objectives has been the transverse pumped laser, as shown in U.S. Pat. No. 3,740,665 wherein the optical axis is transverse to the flow direction of the fluent laser material, or typically dye solution. This permits a rapid replenishment of expended dye into the region of the optical axis to increase both power and repetition rate. To some extent, both power and repetition rate can be augmented by respectively increasing the level of applied excitation to the optical axis and by increasing the flow velocity of the fluent laser material. Excessive heating, and breakdown in fluid dynamic flow characteristics are limiting factors here as well as turbulence effects which are augmented with flow velocity and excitation level due to uneven pressures and heating effects. In addition, the variation in refractive index throughout the fluent laser material produced by pressure and temperature variations greatly degrade the beam quality by contributing to random disorientations of the beam along the optical axis resulting in output beam divergence which may reach large magnitudes particularly at high repetition rates and excitation levels.

SUMMARY OF THE INVENTION

The objectives of high pulse power, high repetition rate, and good beam quality in a laser oscillator or amplifier are provided by a flow channel for a fluent laser material according to the present invention. In such a flow channel, the fluent laser material tranversing the flow channel, and in particular, flowing past a pair of close spaced windows through which transverse excitation radiation is applied, is prepared in advance of application between the windows for minimal temperature and pressure gradients along with reduced turbulence effects to provide a smooth and even laminar flow between the windows. The flow is further treated downstream of the windows to prevent reflections of pressure variations upstream that would affect the flow between the windows.

In particular, fluent laser material is conducted toward the windows in an inlet pipe at a smooth pressure drop and applied through a set of turbulence reducing screens for ultimate direction between the windows. A hydraulic capacitor is provided to absorb or damp further pressure variations in the laser material flowing toward the windows. A heat exchanger is provided to control the temperature of the fluent laser material entering the region between the windows. Channel walls either side of the windows are cooled to compensate for radiant heating caused by scattered excitation radiation and stray dye flourescence.

Downstream of the windows, the spent fluent laser material is exhausted through porous walls which tend to isolate the flow between the windows from downstream pressure effects. An additional hydraulic capacitor is employed downstream of the porous walls to further damp pressure variations and prevent or reduce their reflection back upstream.

Excitation radiation is applied transversely to the flow direction to excite a central portion of the flow between the windows coincident with the optical axis of the laser. Excitation may be either applied in a close coupled arrangement using flashlamps surrounded by a diffuse reflector and closely placed to the windows, or, preferably, by specular reflection of a more remote flashlamp into a central region coincident with the optical axis. The cooling of the flow channel directly upstream and downstream of the region between the two windows minimizes temperature variations in the fluent laser material as it is accellerated to pass between the windows.

The resulting structure provides a high performance laser with good optical beam quality which may be used as either an amplifier or oscillator depending upon the specific application involved.

DESCRIPTION OF THE DRAWING

These and other features of the present invention are more fully set forth below in the solely exemplary and not limiting detailed description of the invention and accompanying drawing of which.

DETAILED DESCRIPTION OF THE INVENTION

The present invention contemplates a flow channel for a laser employing a fluent lasing material wherein pressure and temperature variations in the flowing laser material are controlled and minimized to reduce turbulence and refractive index variations (gradients) along the optical axis where active lasing takes place and to further promote a smooth and even laminar flow of the material past the region of active lasing at the optical axis. The control thus maintained over the flow of laser material permits an increase in laser pulse repetition rate and pulse power, as well as permitting a high quality, low divergence output beam.

Figure 1:
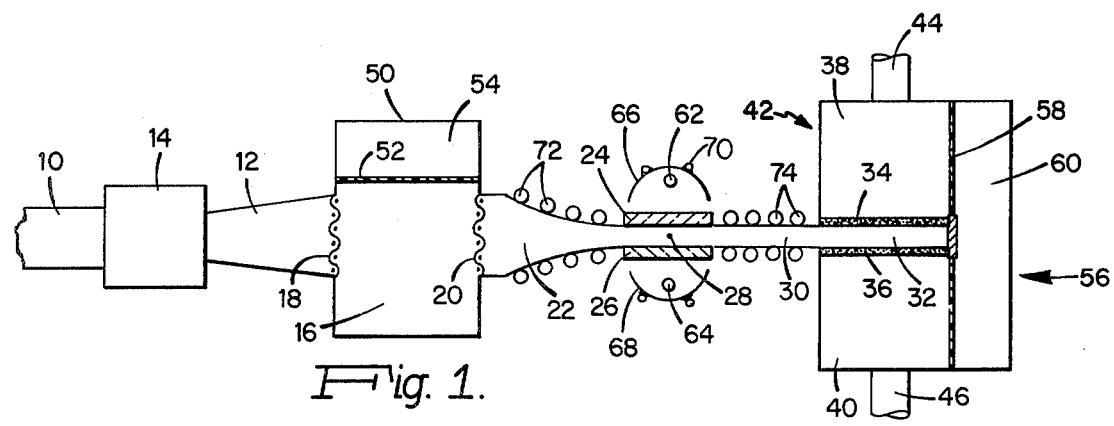
FIG. 1 is a schematic view of component elements of the flow channel according to the present invention.

The various features of a flow channel employing the concepts of the present invention may be briefly described with reference to FIG. 1 showing a generalized representation of the invention in arbitrary dimensions without attempting to show preferred shapes and sizes. As shown there, fluent laser material such as a dye solution is applied through an input conduit 10 past a heat exchanger 14 which maintains a predetermined temperature, for example room temperature, in the flow of laser material in the conduit 12. The flowing laser material passes from the conduit 12 to a plenum 16 through a fine mesh screen 18. The fluent material within the plenum 16 is provided through a further fine mesh screen 20 to a throat conduit 22 that accelerates the fluent laser material and reduces its cross-sectional flow area for application between first and second optically transmissive windows 24 and 26 which enclose an active lasing region 28. While windows 24 and 26 are generally parallel, they typically converge slightly in the downstream direction. Downstream of the windows 24 and 26 a straight conduit 30 exhausts the fluent material from the active region 28 to a conduit region 32 having porous walls 34 and 36 which open into first and second chambers 38 and 40 of an output plenum 42. The dye solution is exhausted from the chambers 38 and 40 through respective output conduits 44 and 46.

Control over the flow dynamics to enhance laser performance and beam quality is additionally provided by the presence of a hydraulic capacitor 50 which is integrally associated within the input plenum 16 to damp fluid pressure variations of the laser material. The hydraulic capacitor 50 typically employs a resilient membrane 52, such as silicone rubber, between the fluid medium within the plenum 16 and a chamber 54 of a compressible material such as air. In addition, the screens 18 and 20 serve to break up large-scale turbulence in the flowing medium both as it enters the plenum 16 and the throat conduit 22.

Downstream of the active lasing region 28 the porous walls 34 and 36 act to isolate the region of flow between the windows 24 and 26, encompassing the active region 28, from pressure variations downstream of the walls 34 and 36 such as in the chambers 38 and 40 and output conduits 44 and 46. This isolation is achieved by the effect of the porous walls 34 and 36 in maintaining a pressure head in the flow of laser material in and downstream of the conduit 30. In addition, a further hydraulic capacitor 56 is provided in communication with the flow of lasing material in the chambers 38 and 40. Hydraulic capacitor 56 includes a resilient membrane 58 between the chambers 38 and 40 and a trapped region 60 of a compressible material.

In the drawing of FIG. 1, the optical axis coincides with the region 28 of active lasing which is energized in the transverse pumping mode by radiation from first and second water cooled flashlamps 62 and 64 respectively. The radiation from the flashlamps 62 and 64 may be closely coupled to region 28 by placement proximate to the windows 24 and 26 and by surrounding the flashlamps with respective diffuse reflectors. Alternatively, the flashlamps 62 and 64 may be located remote from the windows 24 and 26 with the radiation provided by them redirected by specular reflectors, represented by reflectors 66 and 68, to a focus within the flowing medium at the region 28. In either case, cooling as shown by ducts 70 is desirable to remove all unnecessary energy created in exciting the laser material. In addition, cooling ducts 72 placed to cool the upstream flow in the throat conduit 22 and cooling ducts 74 placed to cool the downstream conduit 30 are desirable particularly to remove hot spots along the walls resulting from scattered excitation energy or fluorescence of the lasing material.

Figure 2:
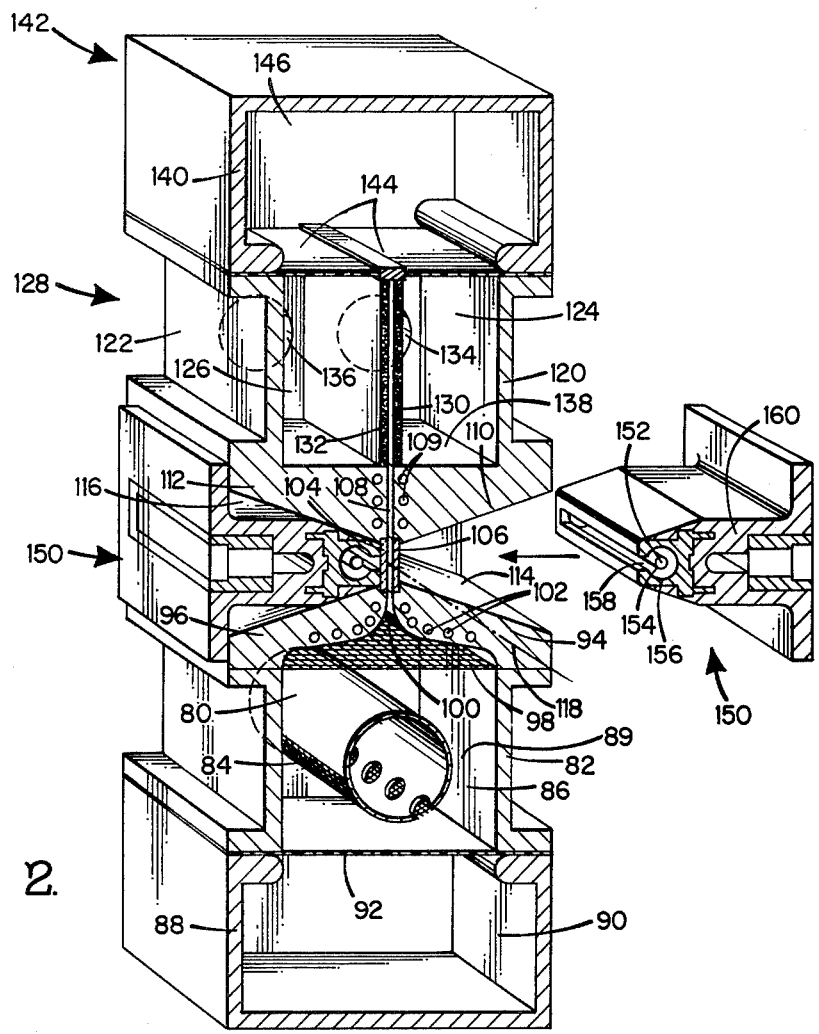
FIG. 2 is a sectional detailed structural view of a first embodiment of the flow channel according to the present invention.

With reference now to FIG 2, a more detailed presentation in cross-section of the structure of a flow channel according to a first embodiment of the invention is illustrated. As shown there, an input conduit 80 is positioned to apply laser fluid to an input plenum 82 through a screen 84. Conduit 80 passes through vertical sidewall 86 and extends the length of plenum 82. It has a series of holes covered by screen 84 for supplying the fluid to the entire length of plenum 82. Below the input plenum 82 is a generally trough-shaped housing 88 defining a chamber 90 of a compressible gas as part of an input hydraulic capacitor. The housing 88 is secured to the plenum 82, such as by bolts, with a resilient membrane 92 such as silicone rubber separating the interior of the plenum 82 from the chamber 90. As a reference to dimensions which may be only approximately to scale in the drawing of FIG. 2, the input conduit 80 may be of approximately 5 cm in diameter.

An input throat conduit defined by walls 94 and 96 is secured to an upper portion of the input plenum 82 with a fine mesh screen 98 clamped between them and separating the interior of the input plenum 82 from a throat region 100 of the dye channel. The mesh of the screens 84 and 98 is typically 250 mesh. Cooling ducts 102 are preferably provided along the throat conduits 94 and 96 in regions adjacent to the throat region 100. The throat conduits 94 and 96 narrow the throat in width for application of the fluid between first and second windows 104 and 106 having a separation of approximately 3 millimeters.

Directly downstream of the windows 104 and 106 an output channel 108 of typically constant cross-sectional area is defined between first and second wall members 110 and 112 having cooling ports 109. The throat conduit elements 94 and 96 may be joined to respective channel wall elements 110 and 112 by rear support members 114 and 116 along with front support members not shown. In addition, the ends of the channel at the extremes into and out of the page of FIG. 2 may be sealed with face plates having windows therein corresponding to and aligned with an optical axis 118 between the windows 104 and 106.

Wall members 120 and 122 are attached to upper edge portions of the channel wall members 110 and 112 which enclose first and second chambers 124 and 126 of an output plenum 128. The chambers 124 and 126 are separated by porous walls 130 and 132 which border on extension of the output channel 108 and provide a pressurehead for the flow of fluent laser material into the chambers 124 and 126.

The porous wall members 130 and 132 are typically of 60 micron porosity and define a channel between them of approximately 2 mm dimension. Exhaust conduits 134 and 136, attached to one end of chambers 124 and 126 evacuate the laser material from the plenum 128. Cooling ports 109 are preferably provided bordering the channel 108 in the channel wall members 110 and 112 to absorb thermal energization of the fluid and channel walls from applied excitation.

A housing 140 of a hydraulic capacitor 142 is secured to upper portions of the plenum walls 120 and 122 with a resilient membrane 144 such as silicone rubber extending between the fluid within the chambers 124 and 126 and a chamber 146 of a compressible gas.

End plates for the hydraulic capacitors and input and output plenums 89 and 142, for sealing the ends of the flow channel at its limits into and out of the page are typically provided as integral components of housings 88 and 140. Input and output conduits for the cooling passages 102 and 109 are also typically provided through these end plates for the conduit walls 94, 96, 110 and 112.

As shown in FIG. 2, a flashlamp assembly insert 150 is provided to mate with outer walls of the throat conduit wall 94 and channel wall member 110 or throat conduit wall 96 and channel wall member 112. The flashlamp assembly insert is shown to include a flashlamp 152 mounted within a cylindrical chamber 154 having a diffuse, cylindrical reflector 156 on the inner surface thereof facing the flashlamp 152. Typically, a cooling fluid such as water is circulated in a pyrex tube, not shown, between the flashlamp 152 and the diffuse reflector 156 in chamber 154 to exhaust heat from the flashtube. The reflector 156 is shown to circle almost entirely around the flashtube 152 leaving an opening 158 which limits the range of applied illumination to the window 106 or window 104, to confine the radiation as nearly as possible to the region of an optical axis or active lasing region 118. The member defining the reflector 156 is typically inserted within a plug 160 which is in turn bolted into the walls 94 and 110 or 96 and 112.

The consideration governing the configuration for the hydraulic capacitors at the input and exit plenums is the need to damp out pressure fluctuations at frequencies greater than a few Hz. In combination with the flow resistance of the channel and the porous wall, a certain amount of hydraulic capacitance is required to achieve the damping. The amount of capacitance is directly related to the volume of the capacitors. Considerations that effect the taper of the throat 100 are as follows: a large change in area to reduce the relative turbulence intensity, a short entrance length to reduce the boundary layer thickness in the entrance region, and a strong convergence just ahead of the straight section to insure relaminarization of the boundary layer.

Figure 3:
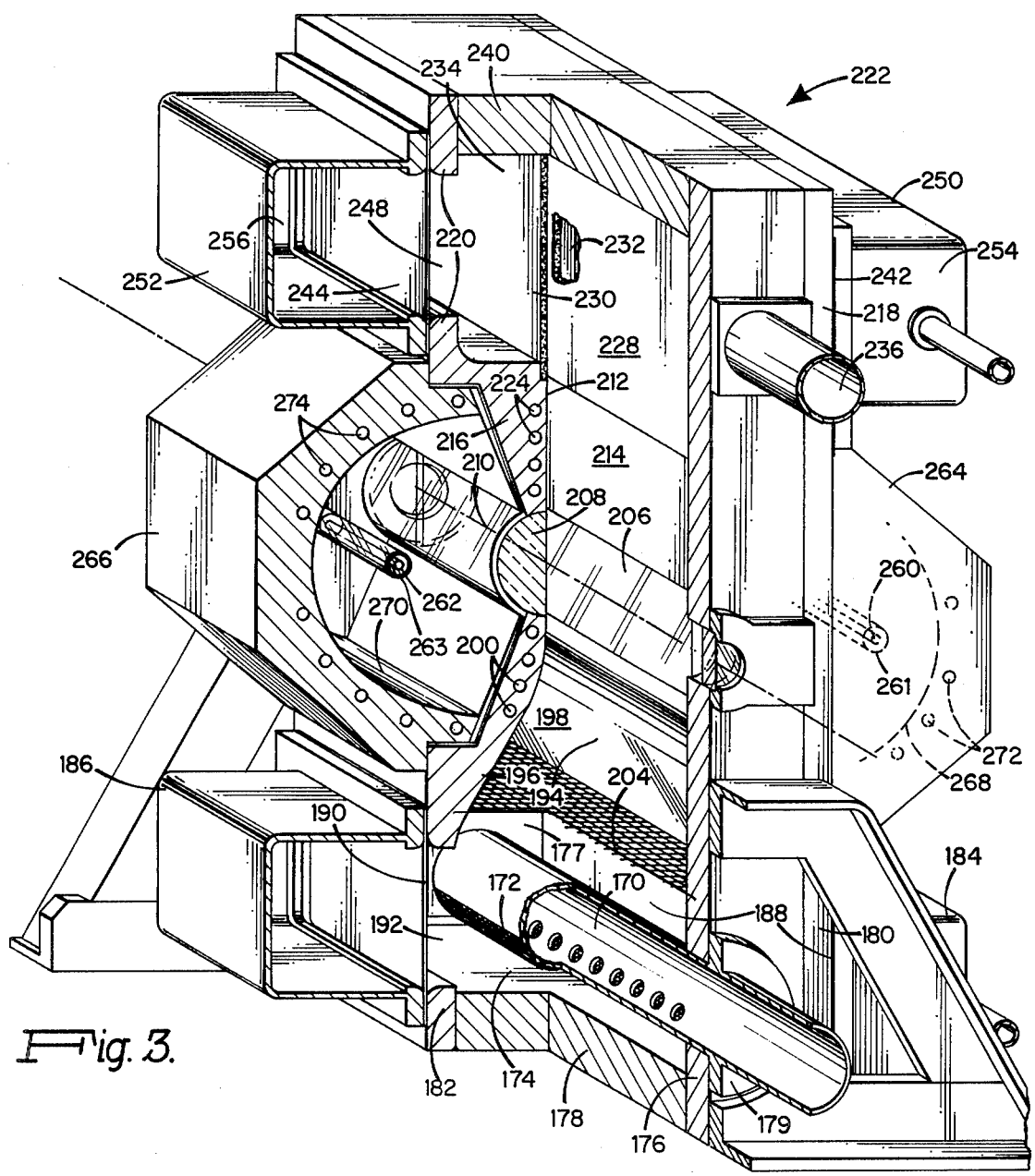
FIG. 3 is a sectional detailed structural view of a further embodiment of the flow channel according to the present invention.

Turning now to FIG. 3, there is shown a more detailed, sectional view of a second embodiment of the invention in which the left-hand portion of the view in FIG. 3 represents a sectional view, while the right-hand portion represents an end view showing exterior details. With specific reference to FIG. 3, an input conduit 170 has holes to apply fluent laser material through a screen 172 into a plenum 174 by extension of conduit 170 through an end wall 176 and collar coupling 179 into plenum 174. The plenum 174 is defined by a bottom plate 178 and side plates 180 and 182 as well as the cover 176 on the facing end and corresponding cover 177 on the end facing away. First and second housings 184 and 186 for hydraulic capacitors are attached to respective side plates 180 and 182 with resilient membranes 188 and 190 fastened between them and the plenum 174 across openings in the respective side walls 180 and 182 such as opening 192 shown in the left on FIG. 3.

The side walls 180 and 182 extend upward as walls 194 and 196 having interior surfaces respectively converging inward to define a throat 198 for the fluid medium. The walls 194 and 196 bordering throat 198 include cooling ports 200 which communicate externally at their ends through conduits not shown. A screen 204 is provided in the lower portion of the throat between the wall extensions 194 and 196 which together with screens 172 provide control over turbulence as indicated above. The plenum wall extensions 194 and 196 terminate at cylindrical windows 206 and 208 which are typically separated by 3 millimeters and extend in the direction of flow 10 cm to border the region of laser excitation, particularly in a central active region about an optical axis 210. Windows 206 and 208, while generally parallel, converge slightly in the downstream direction. Beyond the cylindrical windows 206 and 208 an extension 212 of the flow channel, typically of constant cross-sectional shape and area, is defined by facing wall members 214 and 216 which extend into vertical walls 218 and 220 that border an exit plenum 222. Cooling ports 224 are provided in the wall members 214 and 216 adjacent to the flow channel 212 and have conduits not shown supplying them with a cooling fluid from an external source. Beyond the flow channel region 212 the flow channel is further defined by facing porous walls 228 and 230 spaced approximately 2 millimeters and extending approximately 10 cm to partition the plenum 222 into first and second chambers 232 and 234. The porous walls 228 and 230 may as before be fabricated of sintered stainless steel. Either side of the porous walls 228 and 230 exit conduits 236 and 238, 238 not shown, are attached to ends of chambers 232 and 234 respectively to receive exhausted fluid from the corresponding chamber of the plenum 222. The plenum 222 is further defined on its top by a plate member 240 and by resilient membranes 242 and 244 extending across holes 246 (not shown) and 248 in the respective side walls 218 and 220. Housings 250 and 252 define chambers 254 and 256 on the outer sides of the diaphragms or membranes 242 and 244 to provide hydraulic capacitors for damping fluid pressure variations as explained above.

Flashlamps 260 and 262 contained in pyrex cooling jackets or tubes 261 and 263 are provided remote from the cylindrical outer surfaces of windows 206 and 208 and located within housings 264 and 266 having interior elliptical reflecting surfaces 268 and 270 to provide specular reflection of radiation from the lamps 260 and 262 to optical axis 210. The cylindrical outer surface of the lenses 206 and 208 permits the focusing of this radiation to a central point as, for example, described in U.S. patent application Ser. No. 626,612, filed Oct. 28, 1975, assigned to the same assignee as the present application. In addition, cooling ports 272 and 274 are provided to absorb heat from the flashlamps 260 and 262. The flashlamp structure indicated in FIG. 3 provides the advantage of more remote location of the heat source from the laser region 210 and, with the focusing of surfaces 268 and 270 and windows 206 and 208, high flashlamp flux density in the region of laser excitation.

The above described embodiments are intended to be exemplary only, alternatives and improvements being intended to fall within the scope of the claims.

What is claimed is:

1. A flow channel for liquid fluent laser material of a laser comprising:
   an input plenum positioned to receive a liquid fluent laser material;
   a pair of optically transmissive windows in facing relationship to each other with generally parallel inner surfaces;
   means for applying excitation radiation through said first and second windows;
   a conduit for directing a continuous flow of fluent material from said input plenum to the region between said windows and transverse thereto, said conduit having walls bordering said continuous flow which provide a generally decreasing cross-sectional area between said input plenum and said windows;
   the applied radiation producing heat of said conduit walls from radiation from the fluent material in the region between said windows;

means for abating temperature effects to reduce refractive index gradients in fluent laser material received by said input plenum within the region between said windows; said means comprising:
- cooling ducts associated with said conduit and located adjacent and in thermal contact with said conduit walls at positions bordering said conduit flow at least upstream of and away from the region between said windows;
- said ducts thus operative to cool said conduit walls in the region of said walls adjacent said windows and thus exposed to said heating by said radiation from the region between said windows and thereby to reduce temperature gradients in fluent laser material flowing past said windows;
- an output plenum positioned to accept fluent laser material after flowing between said windows along an extension of said conduit;
- means for exhausting fluent laser material from said output plenum.

2. The channel of claim 1 further including:
first and second screens placed respectively on the input to said input plenum and between said input plenum and said conduit.

3. The flow channel of claim 1 wherein said means for reducing refractive index gradients includes an input conduit for supplying fluent laser material to said input plenum and means for providing a constant temperature in the fluent laser material entering said input conduit to said input plenum.

4. The flow channel of claim 1 wherein:
means for reducing refractive index gradients in the flow of laser material passing between said windows is associated with said output plenum to impede the flow of laser material to thereby reduce variations in refractive index in response to effects in said channel downstream of said windows in the direction of said output plenum.

5. The flow channel of claim 4 wherein said means for reducing refractive index gradients includes a porous wall located in the flow path between said windows and said output plenum to cause fluent laser material to flow therethrough.

6. The flow channel of claim 4 wherein said means for reducing refractive index gradients includes a hydraulic capacitor associated with said output plenum for responding to fluent laser material in said output plenum.

7. The flow channel of claim 1 wherein said means for reducing refractive index gradients further includes:
- an elongated conduit extending the length of said input conduit and having holes therealong facing away from said windows; and
- screens placed over the holes of said elongated conduit.

8. The flow channel of claim 1 wherein said first and second windows converge toward each other along the direction of fluent material flow between said input and output plenums.

9. The flow channel of claim 1 wherein:
said excitation applying means includes a first and second radiation source surrounded by a diffuse reflector and close coupled to the region between said first and second windows; and
said first and second windows include generally planar optically transparent windows.

10. The flow channel of claim 1 wherein:
said means for applying excitation through said first and second windows includes first and second remote sources of optical radiation surrounded at a distance by first and second specular reflectors, each adapted to focus radiation from said first and second sources to the region between said first and second windows;
said first and second windows including a convex surface facing said first and second reflectors respectively to promote focusing of said radiation from said first and second sources essentially within the region between said first and second windows.

11. The flow channel of claim 1 further including a hydraulic capacitor including a compressable gas filled chamber and a membrane partitioning the liquid fluent laser material from said compressible gas filled chamber and operative to absorb pressure variations in said input plenum.

12. A flow channel for liquid fluent laser material of a laser comprising:
- an input plenum positioned to receive a liquid fluent laser material;
- a pair of optically transmissive windows in facing relationship to each other with generally parallel inner surfaces;
- a conduit for continuous flow of fluent material from said input plenum to the region between said windows and providing a generally decreasing cross-sectional area between said input plenum and said windows;
- means for reducing refractive index gradients in fluent laser material received by said input plenum within a region between said windows;
- an output plenum positioned to accept fluent laser material after flowing between said windows;
- means for exhausting fluent lasing material from said output plenum;
- a porous wall located in the flow path between said windows and said output plenum to reduce refractive index gradients in response to effects downstream of said windows.

* * * * *